United States Patent
Shimozawa et al.

(10) Patent No.: US 11,989,535 B2
(45) Date of Patent: May 21, 2024

(54) SIMULATION METHOD AND RECORDING MEDIUM

(71) Applicant: HITACHI SOLUTIONS, LTD., Tokyo (JP)

(72) Inventors: Masafumi Shimozawa, Tokyo (JP); Shin Saito, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 280 days.

(21) Appl. No.: 17/439,228

(22) PCT Filed: Jun. 24, 2020

(86) PCT No.: PCT/JP2020/024897
§ 371 (c)(1),
(2) Date: Sep. 14, 2021

(87) PCT Pub. No.: WO2021/049130
PCT Pub. Date: Mar. 18, 2021

(65) Prior Publication Data
US 2022/0164166 A1    May 26, 2022

(30) Foreign Application Priority Data
Sep. 12, 2019   (JP) .................................. 2019-165886

(51) Int. Cl.
*G06F 9/44*        (2018.01)
*G06F 8/20*        (2018.01)
(Continued)

(52) U.S. Cl.
CPC .................. *G06F 8/35* (2013.01); *G06F 8/24* (2013.01); *G06F 8/457* (2013.01); *G06F 9/54* (2013.01)

(58) Field of Classification Search
CPC ........................................................ G06F 8/35
(Continued)

(56) References Cited

U.S. PATENT DOCUMENTS

| | | | |
|---|---|---|---|
| 7,191,111 B2 * | 3/2007 | Schuppe .................. | G06F 30/33 717/124 |
| 7,490,029 B2 * | 2/2009 | Wasynczuk .............. | G06F 30/20 703/17 |

(Continued)

FOREIGN PATENT DOCUMENTS

| | | | | |
|---|---|---|---|---|
| EP | 3291112 A1 * | 3/2018 | ......... | G05B 19/4155 |
| EP | 3291112 A1 | 3/2018 | | |

(Continued)

OTHER PUBLICATIONS

Ito, et al., Efficient Software Validation by Entire System Virtualization, Virtual Hils, Mar. 11, 2011, p. 243-247, vol. 110, No. 473.
(Continued)

*Primary Examiner* — Evral E Bodden
(74) *Attorney, Agent, or Firm* — Volpe Koenig

(57) ABSTRACT

A method of simulating codes that form a program configured to control a control target includes causing a processor to execute the following: first-setting a first process of executing a simulation of an operation of a code group excluding a specific code among the codes; second-setting a second process of executing a simulation of an operation of a specific model obtained by modeling the specific code; first-simulating, in the first process, a first simulation of a code preceding the specific code in the code group; second-simulating, in the second process, a second simulation of the specific model through use of an execution result of the first simulation by inter-process communication between the first process and the second process; and third-simulating, in the first process, a third simulation of a code succeeding the (Continued)

specific code through use of an execution result of the second simulation by the inter-process communication.

8 Claims, 5 Drawing Sheets

(51) Int. Cl.
  *G06F 8/35* (2018.01)
  *G06F 8/41* (2018.01)
  *G06F 9/54* (2006.01)
(58) Field of Classification Search
  USPC .......................................................... 707/104
  See application file for complete search history.

(56) References Cited

U.S. PATENT DOCUMENTS

| | | | | |
|---|---|---|---|---|
| 7,849,362 | B2* | 12/2010 | Devins | G06F 11/263 |
| | | | | 714/33 |
| 9,152,393 | B1* | 10/2015 | Mani | G06F 8/35 |
| 10,200,399 | B2* | 2/2019 | Agarwal | G06F 21/577 |
| 10,360,327 | B2* | 7/2019 | Clark | G06F 30/20 |
| 2005/0060133 | A1 | 3/2005 | Schuppe | |
| 2006/0010429 | A1 | 1/2006 | Ihara | |
| 2006/0031059 | A1* | 2/2006 | Paterson | G16H 50/50 |
| | | | | 703/22 |
| 2019/0163449 | A1 | 5/2019 | Hein et al. | |

FOREIGN PATENT DOCUMENTS

| | | | |
|---|---|---|---|
| JP | 2004-021907 A | | 1/2004 |
| JP | 2004021907 A | * | 1/2004 |

OTHER PUBLICATIONS

Watanabe, Introduction to System Programming: UNIX System Calls, Understanding Through Practice, Computer Science Library 10, Apr. 25, 2011, p. 154-190, First Edition.

PCT/JP2020/024897, International Search Report, Sep. 24, 2020, 3 pgs.

Extended European Search Report issued on Sep. 1, 2023 for European Patent Application No. 20863158.0.

Wan, J., "Model-Based Design of Time-Triggered Real-Time Embedded systems for industrial automation," IEEE 20th Conference on Emerging Technologies & Factory Automation (ETFA), Luxembourg, Germany, (2015).

* cited by examiner

SIMULATION METHOD AND RECORDING MEDIUM

CLAIM OF PRIORITY

The present application claims priority from Japanese patent application JP 2019-165886 filed on Sep. 12, 2019, the content of which is hereby incorporated by reference into this application.

BACKGROUND

This invention relates to a simulation method and a recording medium.

Model-based development is a system development method that incorporates a simulation technology. In the model-based development, a simulation environment is prepared in each processing step, and a simulation is performed in each processing step to improve quality and development speed at a design stage. When the model-based development is applied to software development, processing steps of the simulation environment are divided into three processing steps, namely, specification examination/design, implementation, and testing. In the specification examination/design, requirements analysis and requirements definition, and basic design and functional design, are performed through use of a model-in-the-loop-simulation (MILS) environment. The MILS refers to a simulation environment in which a specification described by a model is operated as it is as the model.

When the specification examination/design is ended, implementation is performed based on the model created in the specification examination/design. In the implementation, detailed design and unit tests are performed through use of a software-in-the-loop-simulation (SILS) environment. The SILS refers to a simulation environment in which an object code is generated from a source code which is described in, for example, C language and is automatically generated from the model, and the object code is brought into operation.

When the implementation is ended, the testing is performed in a virtual environment using no actual machine. In the testing, integration tests and system tests are performed through use of a hardware-in-the-loop-simulation (HILS) environment. The HILS refers to a simulation environment in which hardware on which software to be developed is implemented and a plant model (vehicle model in a case of an in-vehicle environment) implemented on dedicated hardware are coupled to each other and brought into operation, to thereby enable electrical verification.

In addition, in JP 2004-21907 A, there is disclosed a simulation system for performance evaluation, which is configured to perform a simulation through use of a source program in which descriptions having different levels of abstraction are mixed and pieces of input data having different levels of abstraction. This simulation system for performance evaluation includes: a plurality of compiler means for generating object codes by separating the source program including a mixture of descriptions having different levels of abstraction into descriptions for a plurality of model operation means; and the plurality of model operation means for interpreting and executing input events and the object codes, and is formed of a simulation model in which those means operate in cooperation with each other.

Vehicle manufacturers and suppliers have been shifting to the model-based development, but existing software is mostly formed of only a code, and it is difficult to model all the software at a time. In addition, the current simulation environment is premised on running in a single process, and there is such a problem that a simulation cannot be easily performed when a code and a model are mixed.

In order to execute a part of the code processing as a model in the related-art SILS environment (in a single process), it is conceivable to employ, for example, a method of dividing the code at that point into the first part and the second part, embedding each part as a part of a model, and then sandwiching a target model between the two parts. It suffices that the code processing can be simply divided, but it is difficult to divide the code in a case of a large-scale and complicated code. In the case of such a complicated code, the simulation involving the mixture of the code and the model is given up, and the operation is examined in the SILS environment after the model is auto-coded (in, for example, C code), thereby causing a decrease in software development efficiency.

SUMMARY

This invention has an object to achieve improvement in software development efficiency.

An aspect of the invention disclosed in this application is a method of simulating, by a processor, a plurality of codes that form a program configured to control a control target, the method comprising causing the processor to execute the following: first setting processing for setting a first process of executing a simulation of an operation of a code group excluding a specific code among the plurality of codes; second setting processing for setting a second process of executing a simulation of an operation of a specific model obtained by modeling the specific code; first simulation processing for executing, in the first process, a first simulation of a code preceding the specific code in the code group; second simulation processing for executing, in the second process, a second simulation of the specific model through use of an execution result of the first simulation by inter-process communication between the first process and the second process; and third simulation processing for executing, in the first process, a third simulation of a code succeeding the specific code through use of an execution result of the second simulation by the inter-process communication between the first process and the second process.

According to the representative embodiment of this invention, it is possible to achieve improvement in software development efficiency. Other objects, configurations, and effects than those described above are clarified by the following description of an embodiment.

DETAILED DESCRIPTION OF THE PREFERRED EMBODIMENTS

<Hardware Configuration Example of Simulation Apparatus>

Figure 1:
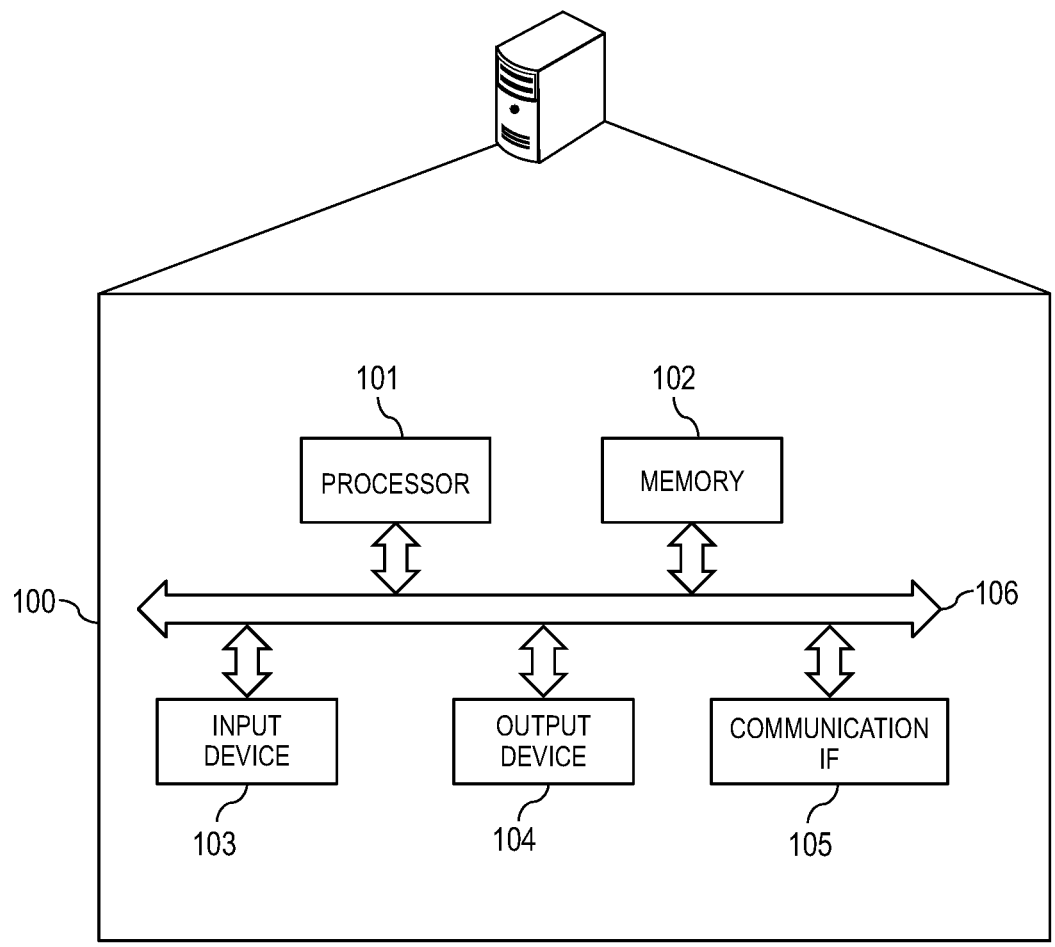
FIG. 1 is a block diagram for illustrating a hardware configuration example of a simulation apparatus.

FIG. 1 is a block diagram for illustrating a hardware configuration example of a simulation apparatus. The simulation apparatus includes a processor 101, a storage device 102, an input device 103, an output device 104, and a communication interface (communication IF) 105. The processor 101, the storage device 102, the input device 103, the output device 104, and the communication IF 105 are coupled to one another through a bus 106. The processor 101 is configured to control the simulation apparatus. The storage device 102 serves as a work area for the processor 101. The storage device 102 is also a non-transitory or transitory recording medium configured to store various programs and various kinds of data. Examples of the storage device 102 include a read only memory (ROM), a random access memory (RAM), a hard disk drive (HDD), and a flash memory. The input device 103 is configured to input data. Examples of the input device 103 include a keyboard, a mouse, a touch panel, a numeric keypad, and a scanner. The output device 104 is configured to output data. Examples of the output device 104 include a display and a printer. The communication IF 105 is coupled to the network, and is configured to transmit and receive data.

<Example of SILS Environment Process>

Figure 2:
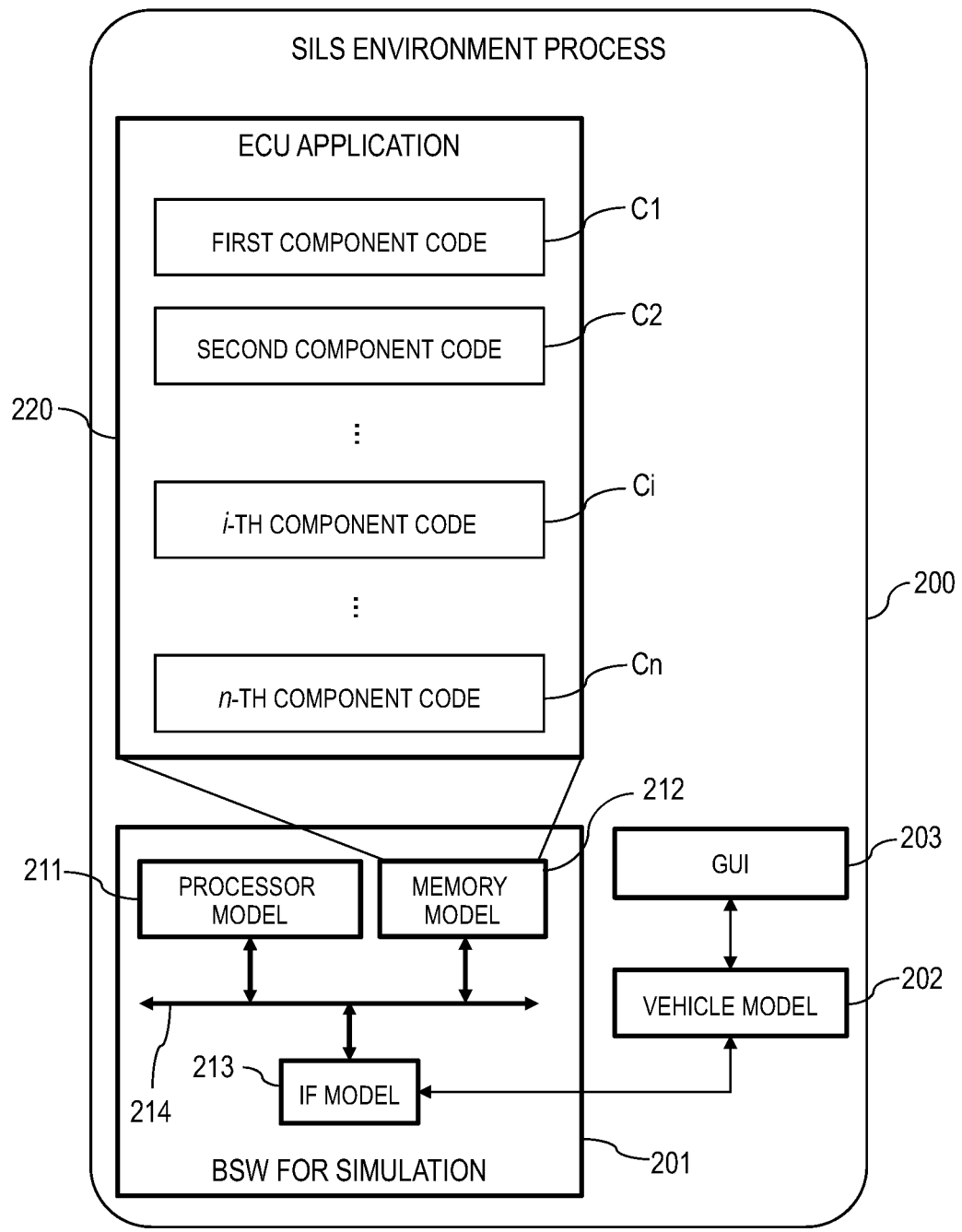
FIG. 2 is an explanatory diagram for illustrating an example of a SILS environment process.

FIG. 2 is an explanatory diagram for illustrating an example of a SILS environment process. A SILS environment process 200 is a process in which a simulation is executed in a SILS environment. The SILS environment process 200 is stored in the memory 102, and is activated by the processor 101, to thereby be built in the memory 102.

The SILS environment process 200 includes a basic software (BSW) 201 for simulation, a vehicle model 202, and a graphical user interface (GUI) 203.

The BSW 201 for simulation is a virtual hardware configuration for simulating an electronic control unit (ECU) application 220 to be simulated. The BSW 201 is also called "infrastructure software."

The BSW 201 for simulation includes a processor model 211, a memory model 212, an IF model 213, and a bus model 214. The processor model 211 executes the ECU application 220 to control the vehicle model 202. The memory model 212 is configured as a work area for the processor model 211. The memory model 212 stores the ECU application 220. The IF model 213 is coupled to the vehicle model 202, and transmits and receives data between the processor model 211 and the vehicle model 202. The bus model 214 couples the processor model 211, the memory model 212, and the IF model 213 so as to enable communication therebetween.

The vehicle model 202 is data obtained by modeling mechanisms inside a vehicle which can have operations electrically controlled, for example, an accelerator, a brake, an engine, an ignition switch, an air conditioner, a light, and a wiper. The vehicle is a moving object capable of traveling on the ground, for example, an automobile such as a passenger car, a bus, or a truck, a motorcycle, an electric bicycle, an electric wheelchair, or a machine tool. The vehicle model 202 is merely an example of a control target, and may be a model other than the model of the vehicle, for example, a model of a home electric appliance such as a refrigerator, a rice cooker, or a microwave oven.

The GUI 203 displays an output result from the vehicle model 202 on the output device 104. Next, description is given of the ECU application 220 stored in the memory model 212.

The ECU application 220 is an example of an application to be simulated. For example, the ECU application 220 is an application for recognizing an object based on moving image data received from a camera. The application to be simulated is determined depending on the model to be controlled.

The ECU application 220 has a first component code C1 to an n-th component code Cn (where n is an integer of 2 or more). A component code freely selected from among the first component code C1 to the n-th component code Cn is referred to as an i-th component code (where i is an integer satisfying $1 \leq i \leq n$). It is assumed that the first component code C1 to the n-th component code Cn are executed in ascending order of i.

<Example of Linked Simulation Environment>

Figure 3:
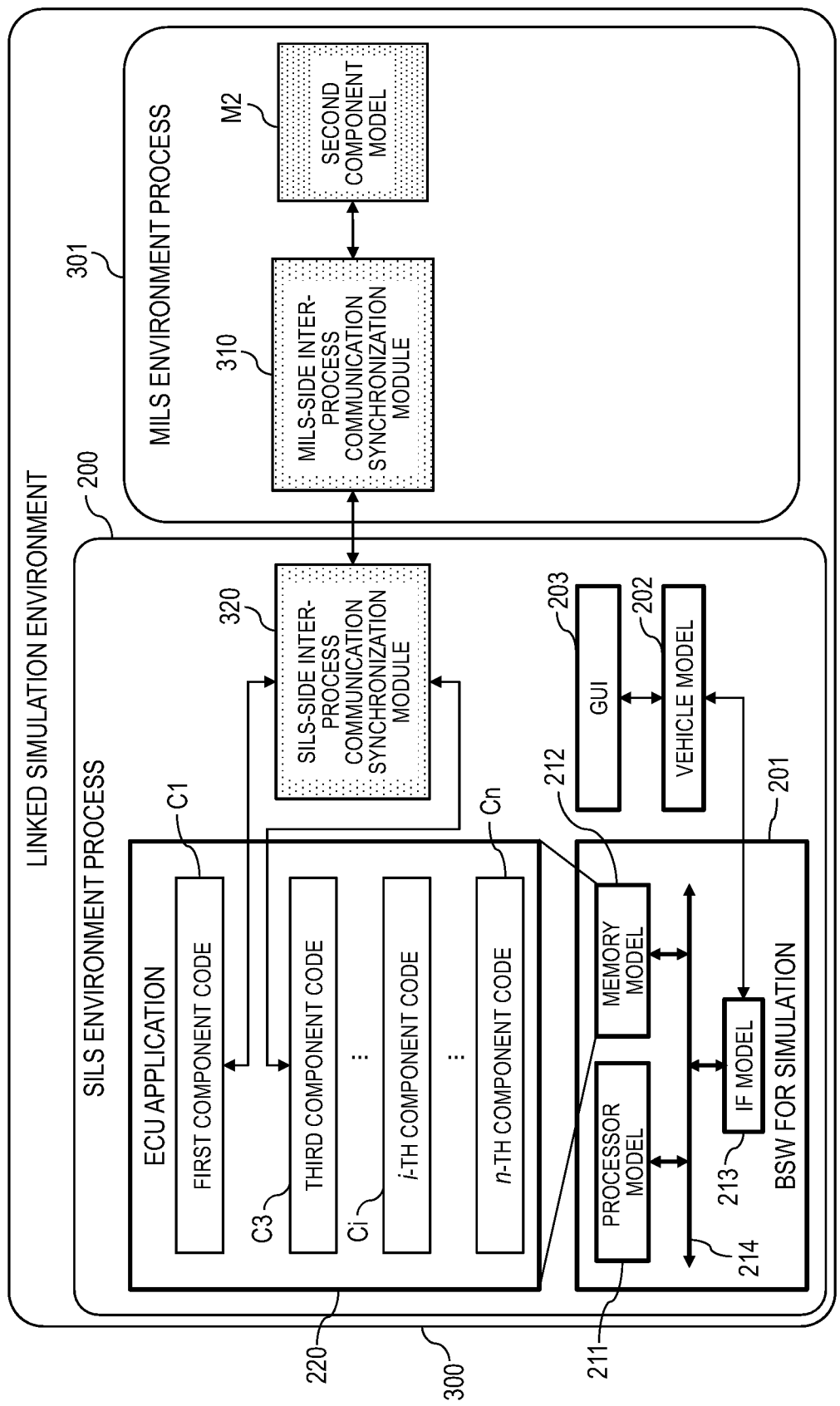
FIG. 3 is an explanatory diagram for illustrating an example of a linked simulation environment.

FIG. 3 is an explanatory diagram for illustrating an example of a linked simulation environment. A linked simulation environment 300 is a simulation environment in which the SILS environment process 200 and a MILS environment process 301 are linked to each other. The MILS environment process 301 is a process in which the simulation is executed in a MILS environment. The MILS environment process 301 is stored in the memory 102, and is activated by the processor 101, to thereby be built in the memory 102.

In FIG. 3, a second component model M2 obtained by modeling the second component code C2 in the ECU application 220 is built in the memory model 212, and is used as a simulation target in place of the second component code C2. Therefore, in the SILS environment process 200, the second component code C2 is excluded from simulation targets in the ECU application 220.

In this case, as an example, the second component code C2 is excluded from the simulation targets, and the second component model M2 is used as the simulation target. However, the i-th component code Ci may be excluded from the simulation targets, and an i-th component model Mi may be used as the simulation target. In addition, the number of component codes to be excluded from the simulation targets is not limited to one, and may be two or more. In this case, two or more component models respectively corresponding to two or more component codes that are excluded from the simulation targets are the simulation targets.

In addition, in the linked simulation environment 300, the SILS environment process 200 has a SILS-side inter-process communication synchronization module 320 built in the memory model 212, and the MILS environment process 301 has a MILS-side inter-process communication synchronization module 310 built in the memory model 212.

The SILS-side inter-process communication synchronization module 320 is coupled to the first component code C1, the third component code C3, and the MILS-side inter-process communication synchronization module 310 so as to enable communication therebetween. The MILS-side inter-process communication synchronization module 310 is coupled to the second component model M2 and the SILS-side inter-process communication synchronization module 320 so as to enable communication therebetween.

An execution result of the first component code C1 by the processor model 211 is transmitted to the second component model M2 through the SILS-side inter-process communication synchronization module 320 and the MILS-side inter-process communication synchronization module 310, and is used as input data for the second component model M2.

An execution result of the second component model M2 by the processor model 211 is transmitted to the third component code C3 through the MILS-side inter-process communication synchronization module 310 and the SILS-side inter-process communication synchronization module 320, and is used as input data for the third component code C3.

When TCP/IP and UDP are applied to the SILS-side inter-process communication synchronization module 320 and the MILS-side inter-process communication synchronization module 310, the MILS environment process 301 may be built in another simulation apparatus. In this case, the MILS environment process 301 is executed on the BSW 201 for simulation built in another simulation apparatus.

<Linked Simulation Execution Example>

Figure 4:
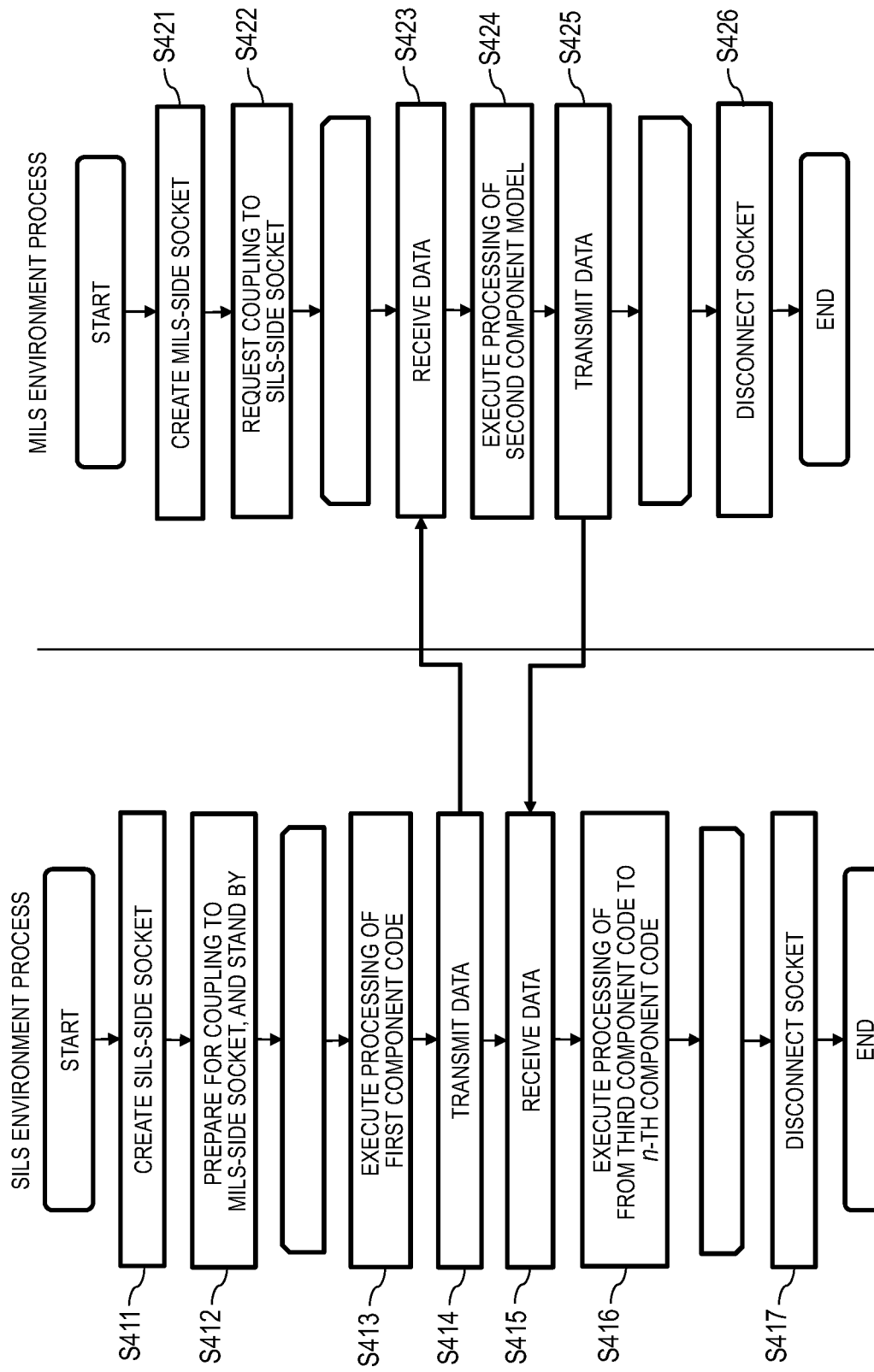
FIG. 4 is a flow chart for illustrating a linked simulation execution example 1 in the linked simulation environment 300 illustrated in FIG. 3.

FIG. 4 is a flow chart for illustrating a linked simulation execution example 1 in the linked simulation environment 300 illustrated in FIG. 3. FIG. 4 is an example of a linked simulation executed when TCP/IP and UDP are applied to the inter-process communication performed by the SILS-side inter-process communication synchronization module 320 and the MILS-side inter-process communication synchronization module 310.

The SILS environment process 200 creates a SILS-side socket in the SILS-side inter-process communication synchronization module 320 (Step S411), prepares for coupling to a MILS-side socket, and stands by (Step S412). Meanwhile, the MILS environment process 301 creates a MILS-side socket in the MILS-side inter-process communication synchronization module 310 (Step S421), and requests coupling to the SILS-side socket (Step S422). Specifically, for example, the MILS environment process 301 transmits the coupling request to the SILS environment process 200.

The SILS environment process 200 stands by for the coupling to the MILS-side socket in Step S412, and establishes the coupling between the SILS-side socket and the MILS-side socket by receiving the coupling request from the MILS environment process 301. Thus, the SILS environment process 200 and the MILS environment process 301 are set to be executable.

After the coupling is established, the SILS environment process 200 executes loop processing from Step S413 to Step S416, and the MILS environment process 301 executes loop processing from Step S423 to Step S425. Both kinds of loop processing are executed a predetermined number of times (for example, for a time period after the vehicle is powered on to start moving until the vehicle travels a predetermined distance to stop).

Specifically, for example, the SILS environment process 200 controls the processor model 211 to execute the processing of the first component code C1 (Step S413). Then, the SILS environment process 200 controls the SILS-side inter-process communication synchronization module 320 to transmit data on an execution result of Step S413 to the second component model M2 through the MILS-side inter-process communication synchronization module 310 (Step S414).

The MILS environment process 301 controls the MILS-side inter-process communication synchronization module 310 to receive the data on the execution result of Step S413 (Step S423). The MILS environment process 301 inputs the data received in Step S423 into the second component model M2, and controls the processor model 211 to execute the processing of the second component model M2 (Step S424). Then, the MILS environment process 301 controls the MILS-side inter-process communication synchronization module 310 to transmit data on an execution result of Step S424 to the third component code C3 through the SILS-side inter-process communication synchronization module 320 (Step S425).

The SILS environment process 200 controls the SILS-side inter-process communication synchronization module 320 to receive data on an execution result of Step S425 (Step S415). The SILS environment process 200 inputs the data received in Step S415 into the third component code C3, and controls the processor model 211 to execute the processing of the third component code C3. After that, the SILS environment process 200 controls the processor model 211 to sequentially execute the processing of from the fourth component code C4 to the n-th component code Cn (Step S416).

When the loop processing is ended, the SILS environment process 200 disconnects the coupling to the MILS-side socket (Step S417), and brings a series of processing to an end. In the same manner, when the loop processing is ended, the MILS environment process 301 disconnects the coupling to the SILS-side socket (Step S426), and brings the series of processing steps to an end.

With reference to FIG. 4, description has been given of the example in which TCP/IP and UDP are applied to the inter-process communication, but pipe processing and message queue may be applied.

Figure 5:
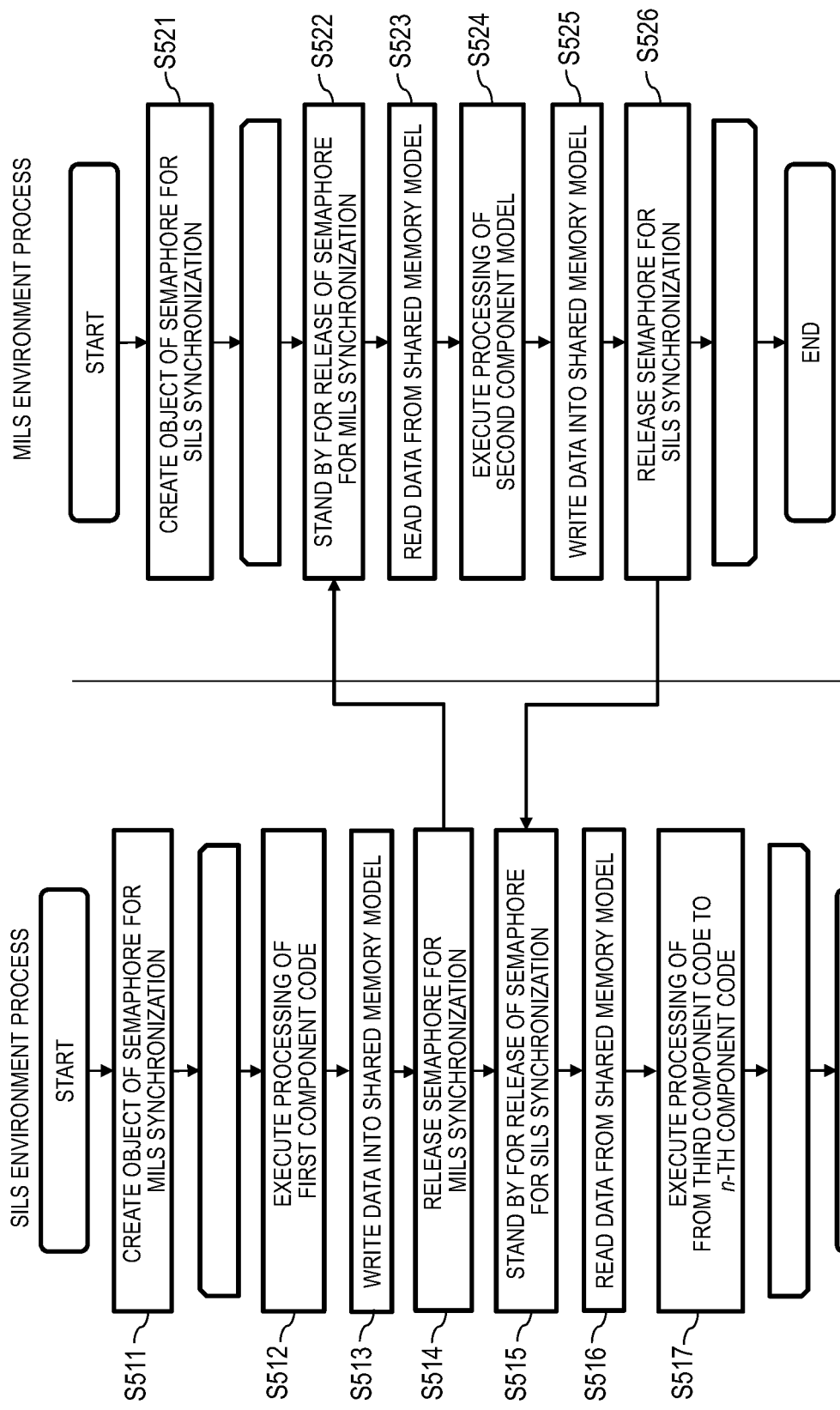
FIG. 5 is a flow chart for illustrating a linked simulation execution example 2 in the linked simulation environment 300 illustrated in FIG. 3.

FIG. 5 is a flow chart for illustrating a linked simulation execution example 2 in the linked simulation environment 300 illustrated in FIG. 3. FIG. 5 is an example of a linked simulation executed when a shared memory model is applied to the inter-process communication. The shared memory model is a predetermined storage area in the memory model 212, and is accessible to the SILS environment process 200 and the MILS environment process 301. Exclusive control of the shared memory model is managed by semaphores. In the case of FIG. 5, the SILS-side inter-process communication synchronization module 320 and the MILS-side inter-process communication synchronization module 310, which are illustrated in FIG. 3, are not built.

The SILS environment process 200 creates an object of a semaphore for synchronization with the MILS environment process 301 (Step S511). Meanwhile, the MILS environment process 301 creates an object of a semaphore for synchronization with the SILS environment process 200 (Step S421).

The SILS environment process 200 executes loop processing from Step S512 to Step S517, and the MILS environment process 301 executes loop processing from Step S522 to Step S526. Both kinds of loop processing are executed a predetermined number of times (for example, for a time period after the vehicle is powered on to start moving until the vehicle travels a predetermined distance to stop).

Specifically, for example, the SILS environment process 200 controls the processor model 211 to execute the processing of the first component code C1 (Step S512). Then, the SILS environment process 200 writes data on an execution result of Step S512 into the shared memory model (Step S513). Then, the SILS environment process 200 releases the semaphore for MILS synchronization, which is created in Step S511 (Step S514).

The MILS environment process 301 stands by for the release of the semaphore for the MILS synchronization of the SILS environment process 200 (Step S522). When the semaphore for the MILS synchronization is released, the shared memory model can be accessed, and hence the MILS environment process 301 reads, from the shared memory model, the data written into the shared memory model in Step S513 (Step S523).

The MILS environment process 301 inputs the data read in Step S523 into the second component model M2, and controls the processor model 211 to execute the processing of the second component model M2 (Step S524). Then, the MILS environment process 301 writes data on an execution result of Step S524 into the shared memory model (Step S525). Then, the SILS environment process 200 releases the semaphore for the MILS synchronization, which is created in Step S521 (Step S526).

The SILS environment process 200 stands by for the release of a semaphore for SILS synchronization of the MILS environment process 301 (Step S515). When the semaphore for the SILS synchronization is released, the shared memory model can be accessed, and hence the SILS environment process 200 reads, from the shared memory model, the data written into the shared memory model in Step S525 (Step S516).

The SILS environment process 200 inputs the data read in Step S516 into the third component code C3, and controls the processor model 211 to execute the processing of the third component code C3. After that, the SILS environment process 200 controls the processor model 211 to sequentially execute the processing of from the fourth component code C4 to the n-th component code Cn (Step S517).

When the loop processing is ended, the SILS environment process 200 brings the series of processing steps to an end. In the same manner, when the loop processing is ended, the MILS environment process 301 brings the series of processing steps to an end.

In this manner, according to the above-mentioned at least one embodiment, it is possible to achieve facilitation of the simulation of software involving a mixture of the code and the model, and it is possible to easily build an environment in which the code and the model are mixed. Thus, it is possible to achieve improved efficiency in development of software involving a mixture of the code and the model.

Further, when an environment in which the code and the model are mixed is built, it is possible to verify an operation in the simulation by flexibly expanding the range of application of code modeling. Therefore, it is possible to achieve a method of converting the entire code into a model while performing equivalence verification.

Further, the processes performed in the simulation of the code and the model are separated, and bidirectional data is exchanged across the processes by synchronizing the processes by the inter-process communication, to thereby be able to achieve a unified simulation time period.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A method of simulating, by a processor, a plurality of codes that form a program configured to control a control target, the method comprising causing the processor to execute the following:

first setting processing for setting a first process of executing a software in a loop simulation of an operation of a code group excluding a specific code among the plurality of codes;

second setting processing for setting a second process of executing a model in a loop simulation of an operation of a specific model obtained by modeling the specific code;

first simulation processing for executing, in the first process, a first simulation of a code preceding the specific code in the code group;

second simulation processing for executing, in the second process, a second simulation of the specific model through use of an execution result of the first simulation by inter-process communication between the first process and the second process;

third simulation processing for executing, in the first process, a third simulation of a code succeeding the specific code through use of an execution result of the second simulation by the inter-process communication between the first process and the second process;

setting, by the processor, in the first setting processing, a first semaphore for managing exclusive control of the second process in the first process, and setting a shared storage area accessible to the second process so that the shared storage area is accessible to the first process;

setting, by the processor, in the second setting processing, a second semaphore for managing exclusive control of the first process in the second process, and setting the shared storage area so that the shared storage area is accessible to the second process;

storing, by the processor, in the first simulation processing, the execution result of the first simulation in the shared storage area, and releasing the first semaphore for the second process;

acquiring, by the processor, in the second simulation processing, the execution result of the first simulation, which is stored in the shared storage area, when the first semaphore is released, executing the simulation of the specific model in the second process, storing the execution result of the second simulation in the shared storage area, and releasing the second semaphore for the first process; and acquiring, by the processor, in the third simulation processing, the execution result of the second simulation, which is stored in the shared storage area, when the second semaphore is released, and executing the third simulation of the code succeeding the specific code in the first process;

wherein exclusive control of the shared storage area is managed by the first and second semaphores.

2. The simulation method according to claim 1, further comprising:
setting, by the processor, in the first setting processing, a first communication module configured to communicate to/from the second process in the first process;
setting, by the processor, in the second setting processing, a second communication module configured to communicate to/from the first process in the second process;
transmitting, by the processor, in the first simulation processing, the execution result of the first simulation to the specific model through the second communication module through use of the first communication module;
receiving, by the processor, in the second simulation processing, the execution result of the first simulation through use of the second communication module, executing the simulation of the specific model in the second process, and transmitting the execution result of the second simulation to the code succeeding the specific code through the second communication module through use of the second communication module; and
receiving, by the processor, in the third simulation processing, the execution result of the second simulation through use of the first communication module, and executing the third simulation of the code succeeding the specific code in the first process.

3. The simulation method according to claim 2, further comprising:
executing, by a processor of a first computer, the first setting processing, the first simulation processing, and the third simulation processing; and
executing, by a processor of a second computer different from the first computer, the second setting processing and the second simulation processing.

4. The simulation method according to claim 1, wherein the control target comprises a vehicle model.

5. A non-transitory computer-readable recording medium for causing a processor to execute a simulation of a plurality of codes that form a program configured to control a control target, the simulation program causing the processor to execute the following:
first setting processing for setting a first process of executing a software in a loop simulation of an operation of a code group excluding a specific code among the plurality of codes;
second setting processing for setting a second process of executing a model in a loop simulation of an operation of a specific model obtained by modeling the specific code;
first simulation processing for executing, in the first process, a first simulation of a code preceding the specific code in the code group;
second simulation processing for executing, in the second process, a second simulation of the specific model through use of an execution result of the first simulation by inter-process communication between the first process and the second process;
third simulation processing for executing, in the first process, a third simulation of a code succeeding the specific code through use of an execution result of the second simulation by the inter-process communication between the first process and the second process;
wherein the simulation program further causes:
the processor to set, in the first setting processing, a first semaphore for managing exclusive control of the second process in the first process, and set a shared storage area accessible to the second process so that the shared storage area is accessible to the first process;
the processor to set, in the second setting processing, a second semaphore for managing exclusive control of the first process in the second process, and set the shared storage area so that the shared storage area is accessible to the second process;
the processor to store, in the first simulation processing, the execution result of the first simulation in the shared storage area, and release the first semaphore for the second process;
the processor to acquire, in the second simulation processing, the execution result of the first simulation, which is stored in the shared storage area, when the first semaphore is released, execute the simulation of the specific model in the second process, store the execution result of the second simulation in the shared storage area, and release the second semaphore for the first process; and
the processor to acquire, in the third simulation processing, the execution result of the second simulation, which is stored in the shared storage area, when the second semaphore is released, and execute the third simulation of the code succeeding the specific code in the first process.

6. The non-transitory computer-readable recording medium having the simulation program recorded thereon according to claim 5, wherein the simulation program further causes:
the processor to set, in the first setting processing, a first communication module configured to communicate to/from the second process in the first process;
the processor to set, in the second setting processing, a second communication module configured to communicate to/from the first process in the second process;
the processor to transmit, in the first simulation processing, the execution result of the first simulation to the specific model through the second communication module through use of the first communication module;
the processor to receive, in the second simulation processing, the execution result of the first simulation through use of the second communication module, execute the simulation of the specific model in the second process, and transmit the execution result of the second simulation to the code succeeding the specific code through the second communication module through use of the second communication module; and
the processor to receive, in the third simulation processing, the execution result of the second simulation through use of the first communication module, and execute the third simulation of the code succeeding the specific code in the first process.

7. The non-transitory computer-readable recording medium having the simulation program recorded thereon according to claim 6, wherein the simulation program further causes:
a processor of a first computer to execute the first setting processing, the first simulation processing, and the third simulation processing; and
a processor of a second computer different from the first computer to execute the second setting processing and the second simulation processing.

8. The non-transitory computer-readable recording medium having the simulation program recorded thereon according to claim 5, wherein the control target comprises a vehicle model.

* * * * *